United States Patent [19]

Sweeney

[11] Patent Number: 5,015,014

[45] Date of Patent: May 14, 1991

[54] PLASTIC PIPE SECTION

[75] Inventor: Gerald T. Sweeney, Puyallup, Wash.

[73] Assignee: Aardvark Corporation, Inc., Puyallup, Wash.

[21] Appl. No.: 368,236

[22] Filed: Jun. 19, 1989

[51] Int. Cl.$^5$ .............................................. F16L 00/00
[52] U.S. Cl. ........................................ 285/81; 285/92; 285/328; 285/351; 285/423; 285/921; 29/453
[58] Field of Search .............. 285/423, 260, 921, 337, 285/351, 328, 81, 92; 29/453

[56] References Cited

U.S. PATENT DOCUMENTS

| 1,270,300 | 6/1918 | King et al. | 285/337 |
|---|---|---|---|
| 2,366,067 | 6/1943 | Smith | 285/921 X |
| 2,547,321 | 4/1951 | Henderson | 285/351 X |
| 2,889,089 | 6/1954 | Herrick et al. | 285/921 X |
| 2,947,071 | 8/1960 | Marchant | 285/921 X |
| 3,784,235 | 1/1974 | Kessler et al. | 285/921 |
| 4,474,392 | 10/1984 | Vassallo | 285/921 X |
| 4,616,855 | 10/1986 | Ruhle | 285/94 X |
| 4,779,902 | 10/1988 | Lee | 285/423 X |

FOREIGN PATENT DOCUMENTS

908930 10/1962 United Kingdom ................ 285/921
928911 6/1963 United Kingdom ................ 285/921

Primary Examiner—Dave W. Arola
Attorney, Agent, or Firm—Christopher O. Duffy

[57] ABSTRACT

The end portions of the pipe section 2 have annular rabbets 14 and 16 in the outer and inner peripheral surfaces 10 and 12 thereof. The axially extending surfaces 14″ and 16″ of the rabbets are tapered substantially at a common angle so that when a pair 2′ and 2″ of the pipe sections are reversedly disposed end-to-end of one another, and driven together, the two sections form a male/female joint 18 therebetween. The joint is preserved by providing sets of axially successive ribs 20 and grooves 22 on the axially extending surfaces of the rabbets, which interengage with one another when the ends 8 of the sections abut the transversely disposed surfaces 14′ and 16′ of the rabbets.

30 Claims, 4 Drawing Sheets

PLASTIC PIPE SECTION

DESCRIPTION

1. Technical Field

This invention relates to the make up of plastic pipe using lengths of the pipe, and perhaps couplings, tees, elbows and other fittings as well, all of which have tubular bodies and shall be referred to hereafter as "plastic pipe sections". More particularly, the invention relates to a plastic pipe section which has ends that are fabricated to enable two or more of the sections to be joined together by arranging them end-to-end of one another on a common axis and driving them, or otherwise reciprocating them relatively toward one another to form a male/female-type joint therebetween.

2. Background Art

In making up plastic pipe, it is not always necessary that the joints of the same be altogether leakproof. In many instances, it is only necessary that each joint be substantially leakproof, or reasonably so, so long as the joint is capable of remaining intact under the stress of usage. For example, some plastic pipe is used only to hold solids, such as explosives, or to hold high viscosity liquids or powders which, like solids, do not undergo appreciable flow in the pipe. Other plastic pipe is used only for certain underground operations wherein there is little requirement for fluid-tight joints such as in the operation of monitoring ground water flow, or dewatering a ground water formation, or transporting certain liquids such as mine leachates which do not require that the pipe have fluid-tight joints, so long as each joint will remain intact while the leachate is flowing through the pipe. In some instances, too, such as in the case of gas pipe line additions, a less than leakproof joint may be acceptable, so long as it is reinforced by a supplemental seal, either inside or outside of the joint, or both.

DISCLOSURE OF THE INVENTION

The present invention provides a plastic pipe section which can be arranged end-to-end with another such pipe section and joined by driving, screwing or otherwise forcing the sections together until they make a male/female joint therebetween which is sufficiently fluid-tight to hold most non-potable liquids, gases and solids. If need be, the joint may also be supplemented with an annular seal thereabout to render it substantially leakproof. According to the invention, the plastic pipe section comprises a tubular body having an axis extending between the ends thereof and relatively outer and inner peripheral surfaces thereon. The ends of the body have annular rabbets formed therein at the relatively outer and inner peripheral surfaces thereof, respectively, and the rabbets have surfaces which are disposed relatively transverse the axis, and surfaces which extend relatively lengthwise of the axis. The axially extending surfaces of the rabbets are tapered to the axis and substantially at a common angle to the axis so that when a pair of the pipe sections are reversedly disposed end-to-end of one another on a common axis, the end portion of one pipe section telescopes within the end portion of the other pipe section, to form a male/female joint therebetween, when the sections are reciprocated relatively toward one another along the axis to abut the ends of the pipe sections with the transversely disposed surfaces of the rabbets therein. To preserve the joint, meanwhile, the axially extending surfaces of the rabbets have sets of axially successive ribs and grooves relatively raised thereon and recessed therein, respectively, which extend about the axis of the body in planes transverse thereof and are disposed on the rabbets so that the ribs of the respective surfaces interengage with the grooves of the respective surfaces, and vice versa, when the ends of the sections abut the transversely disposed surfaces of the rabbets, and vice versa.

Preferably, the pipe sections are uniformly sized and shaped, and the ends of the sections and the transversely disposed surfaces of the rabbets therein, are adapted so that the relatively outer and inner peripheries of the joint are flush with the surfaces of the sections at the relatively outer and inner peripheries thereof, respectively. Preferably, too, the axially extending surfaces of the rabbets have successive sets of axially successive ribs and grooves relatively raised thereon and recessed therein, respectively, and where possible, the sets of ribs and grooves are substantially coextensive with the axially extending surfaces of the rabbets between the ends of the pipe sections and the transversely disposed surfaces of the rabbets therein.

In some of the presently preferred embodiments of the invention, the ribs of the respective axially extending surfaces of the rabbets have flanks and crests thereon which are angularly related to one another to extend generally transverse of and lengthwise of the axis, respectively; and the flanks of the ribs are oriented in opposing directions of the axis from the one pipe section to the other, and are sufficiently acute to the axis that the ribs and grooves of the respective pipe sections snap engage with one another, to interlock the sections, when the crests of the respective ribs slidably reciprocate past one another in the forming of the joint. In other of the presently preferred embodiments of the invention, the flanks of the ribs are sufficiently oblique to the axis that the ribs and grooves of the respective pipe sections detachably interengage with one another, to detachably interconnect the sections, when the crests of the respective ribs slidably reciprocate past one another in the forming of the joint. For example, in certain of the latter embodiments, the flanks and crests of the respective ribs form the sides of an oblique angle and coterminate at the apex of the angle. In others, the flanks and crests of the respective ribs are obliquely angled to one another, but have a surface interposed therebetween that forms a rounded fillet for the angle at a point opposite the apex thereof.

The combination often further comprises an annular seal of elastomeric material and an annular clamping device which are circumposed about the pair of pipe sections, to provide a secondary seal between the sections at the outside of the joint. In certain embodiments of the invention, moreover, the transversely disposed surface of the rabbet in the male pipe section has a chamfered corner at the outer peripheral edge thereof, and the end of the female pipe section has a correspondingly, but oppositely chamfered corner at the outer peripheral edge thereof, to cooperate in forming a circumferential groove about the outer periphery of the joint within which the seal can be accommodated when the clamping device is actuated to engage the seal about the joint.

The pipe sections may be reciprocated relatively toward one another along the axis, to form the joint, by one of several techniques. For example, a flanged plug may be inserted in that end of one or the other pipe section remote from the end thereof adjacent the remaining pipe section or sections, and hammer blows may be applied to the plug to drive the sections into interengagement with one another. Or a pair of clamps may be secured to the respective end-to-end sections, a drive mechanism that is shiftable parallel to the axis of the sections may be interconnected to the pair of clamps, and the drive mechanism may be actuated to effect relative reciprocable motion between the pipe sections along the axis.

In one special group of embodiments, the pipe sections are reciprocated relatively toward one another along the axis by forming sets of threads on the axially extending surfaces of the rabbets between the sets of ribs and grooves and the end of the female pipe section and the transversely disposed surface of the rabbet in the male pipe section, respectively. The male pipe section is rotatably telescoped into the female pipe section, first to interengage the sets of threads with one another, and then to rotate the sets of threads beyond one another in the direction of the transversely disposed surfaces of the rabbets, and abut the ends of the sections with said surfaces, and vice versa, to interengage the respective sets of ribs and grooves with one another and form the joint.

BRIEF DESCRIPTION OF THE DRAWINGS

These features will be better understood by reference to the accompanying drawings which illustrate several of the presently preferred embodiments of the invention.

In the drawings.

BEST MODE FOR CARRYING OUT THE INVENTION

Referring to the drawings, it will be seen that the pipe sections 2 are uniformly sized and shaped and each comprise a plain cylindrical tubular body 4 of typically 4–10 inches in diameter, having an axis 6 extending between the ends 8 thereof, and relatively outer and inner peripheral surfaces 10 and 12 thereon. The respective end portions 8' and 8" of the body 4 have annular rabbets 14 and 16 formed therein at the relatively outer and inner peripheral surfaces 10 and 12 thereof, respectively. The rabbets 14 and 16 provide male and female end portions 8' and 8" respectively, whereby when a pair of the pipe sections 2' are reversedly disposed as shown, end to end of one another on a common axis 6, the male end portion 8' of one pipe section 2' can be slideably inserted within the female end portion 8" of the other pipe section 2" to form a male/female joint 18 therebetween when the pipe sections are reciprocated relatively toward one another along the common axis 6 thereof to be joined together.

The rabbets 14 and 16 have surfaces 14' and 16' which are disposed relatively transverse the axis 6, and surfaces 14" and 16" which extend relatively lengthwise of the axis 6. The axially extending surfaces 14" and 16" of the rabbets have retainer means 19 thereon which are cooperatively engageable from the one pipe section 2' to the other 2" and comprise successive sets of similarly shaped and sized axially successive and axially contiguous ribs 20 and grooves 22 relatively raised thereon and recessed therein, respectively. The respective crests 21 and 23 and bottoms 25 and 27 of the ribs and grooves extend in full circles about the axis 6 of each pipe section, and the crests 21 of the respective ribs 20 of the male end portion 8' and the bottoms 27 of the respective grooves 22 of the female end portion 8" extend at their centers in axially spaced relatively outer circles coinciding substantially with a common relatively outer cylindrical surface of revolution about the axis 6. Likewise, the bottoms 25 of the respective grooves 22 of the male end portion 8' and the crests 23 of the respective ribs 20 of the female end portion 8" extend at their centers in axially spaced relatively inner circles coinciding substantially with a common relatively inner cylindrical surface of revolution about the axis 6 spaced relatively inwardly thereof from the relatively outer cylindrical surface of revolution thereabout. Meanwhile, the axial spacing between the relatively outer circles is the same both between the crests 21 of adjacent ribs 20 on the male end portions 8' and between the bottoms 27 of adjacent grooves 22 on the female end portion 8", and the axial spacing between the relatively inner circles is the same both between the bottoms 25 of adjacent grooves 22 on the male end portion 8' and between the crest 23 of adjacent ribs 20 on the female end portion 8", so that when the male end portion 8' of the one pipe section 2' is slideably inserted within the female end portion 8" of the other pipe section 2" in forming the joint 18, each of the successive sets of ribs 20 and grooves 22 on the male end portion 8' progressively cooperating engages with each of the successive sets of ribs 20 and grooves 22 on the female end portion 8", to progressively ratchet the retainer means 19 together axially of the pipe sections until the ends 8 thereof abut the transversely disposed surfaces 14' and 16' of the rabbets.

The respective ribs 20 of the respective male and female end portions 8' and 8" have leading flanks 26 thereon which are disposed on those sides of the respective ribs 20 oriented axially toward the respective ends 8 of the pipe sections, and the leading flanks 26 are conical and tapered toward the axis 6 from the crests 21 and 23 of the respective ribs at substantially the same acute angle thereto, so that when the respective sets of ribs 20 and grooves 22 on the respective male and female end portions of the pair of pipe sections progressively cooperatively engage with one another in ratcheting the retainer means 19 together, the leading flanks 26 of the respective ribs provide cooperatively slideably engageable cam surfaces thereon whereby the female end portion 8" of the aforesaid other pipe section 2" is progressively distended by the male end portion 8' of the one pipe section 2', from one set to the next, and alternately allowed to contract from set to set until the end 8 of the respective pipe sections abut the transversely disposed surfaces 14' and 16' of the rabbets and the distended female end portion 8" of the aforesaid other pipe section 2" contracts for the last time about the male end portion 8' of the one pipe section 2'. Additionally, the respective ribs 20 of the respective male and female end portions have trailing flanks 24 thereon which are disposed on the opposing sides thereof oriented axially toward the respective transversely disposed surfaces 14' and 16' of the respective rabbets on the respective end portions, and the trailing flanks 24 of the respective ribs 20 are inclined to the axis 6 from the crests 21 and 23 of the respective ribs at substantially a common angle thereto adapted so that when the ends 8 of the respective pipe sections abut the transversely disposed surfaces 14' and 16' of the rabbets and the distended female end portion 8" of the aforesaid other pipe section 2" contracts for the last time, the end portions 8' and 8" of the pair of pipe sections are sufficiently interengaged to preserve the joint 18 for use.

Depending upon whether the resulting pipe string is to be more or less capable of disassembly at the joint 18, the trailing flanks 24 of the ribs 20 are more or less acutely angled to the axis 6. For example, in the embodiments of FIGS. 1-3, the trailing flanks 24' of the respective ribs 20' of the respective male and female end portions of the pipe sections are sufficiently acute to the axis that the ribs 20' and grooves 22' of the respective pipe sections 2' and 2" snap engage with one another, to interlock the sections, when the ends 8 of the respective pipe sections abut the transversely disposed surfaces 14' and 16' of the rabbets and the distended female end portion 8" of the aforesaid other pipe section 2" contracts for the last time. In fact, the trailing flanks 24' of the respective ribs 20' are commonly inclined to the axis from the crests 21 and 23 of the respective ribs at substantially right angles thereto, as shown. Moreover, the leading and trailing flanks 26' and 24' of the respective ribs 20' of the respective male and female pipe sections coterminate substantially at the respective outer and inner circles 21 and 23, respectively, as shown.

Figure 1:
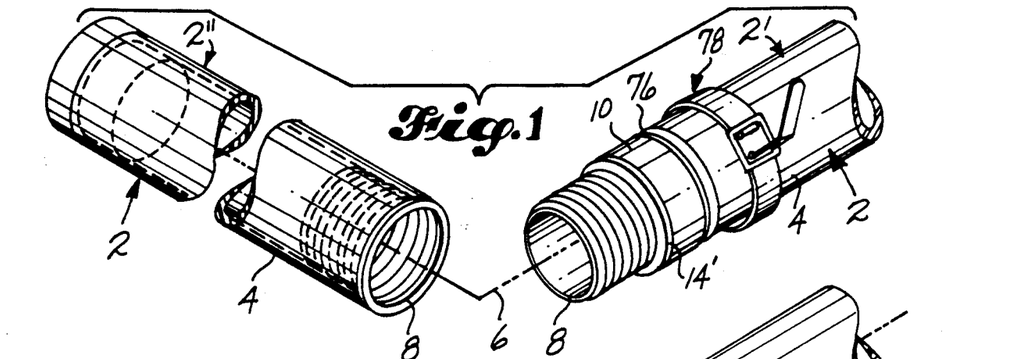
FIG. 1 is a perspective view of a pair of end-to-end plastic pipe sections, the adjacent end portions of which are adapted to interlock with one another when the sections are reciprocated relatively toward one another along the common axis thereof.
Figure 2:
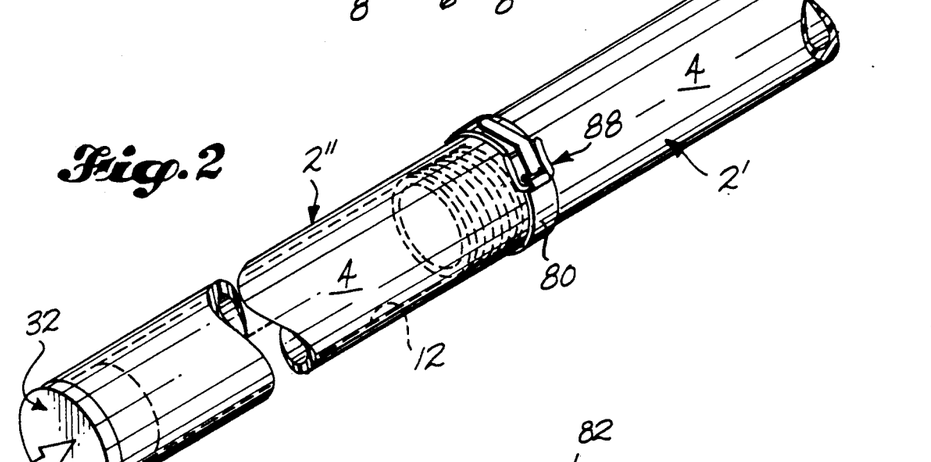
FIG. 2 is a perspective view of the pipe string resulting from interengaging the sections with one another as indicated, and also illustrating one means and mode for joining the pipe sections, and one means for forming a secondary seal around the joint therebetween.
Figure 3:
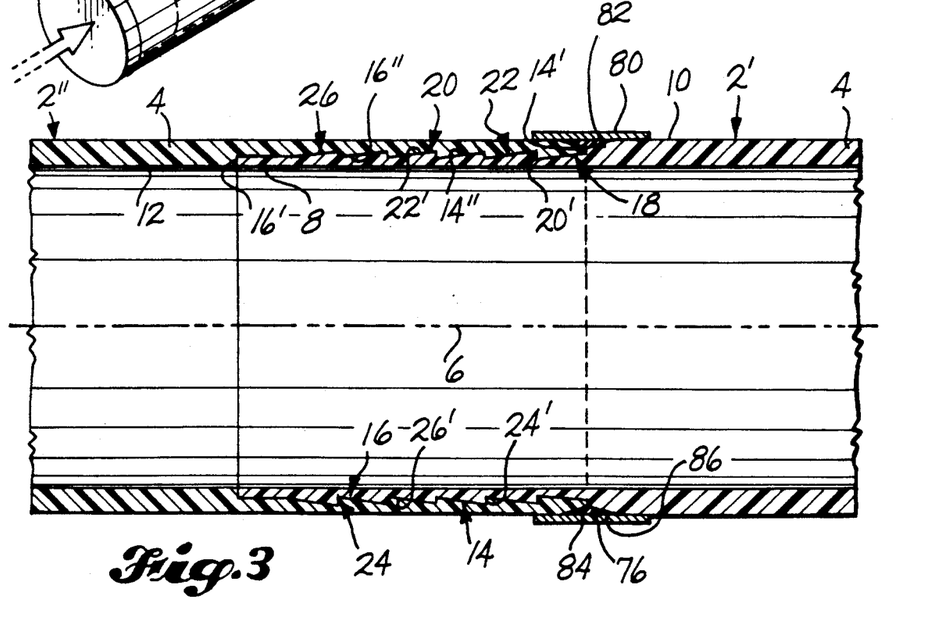
FIG. 3 is a cross-sectional view along the end-to-end axis of the pipe sections in FIG. 2.

Meanwhile, the leading flanks 26' of the respective ribs are inclined to the axis 6 at a sufficiently low angle of inclination to enable the crests 21 and 23 to slide past one another within the flexibility and resiliency of which the hoop tension of the respective pipe sections permits. This depends in part on the plastic material of which each section is fabricated, and in part on the diameter and wall thickness of the section, as well as the pitch or number of ribs per inch. In conventional sizes and thicknesses, semi-rigid but resiliently distensible pipe made of polyethylene, polybutylene, polyvinylchloride, acrylonitrilebutadiene styrene copolymer ("ABS pipe") or either of two types of TEFLON brand pipe, polytetrafluorethylene and ethylene tetrafluorethylene, is the most suitable to join in this fashion.

Figure 4:
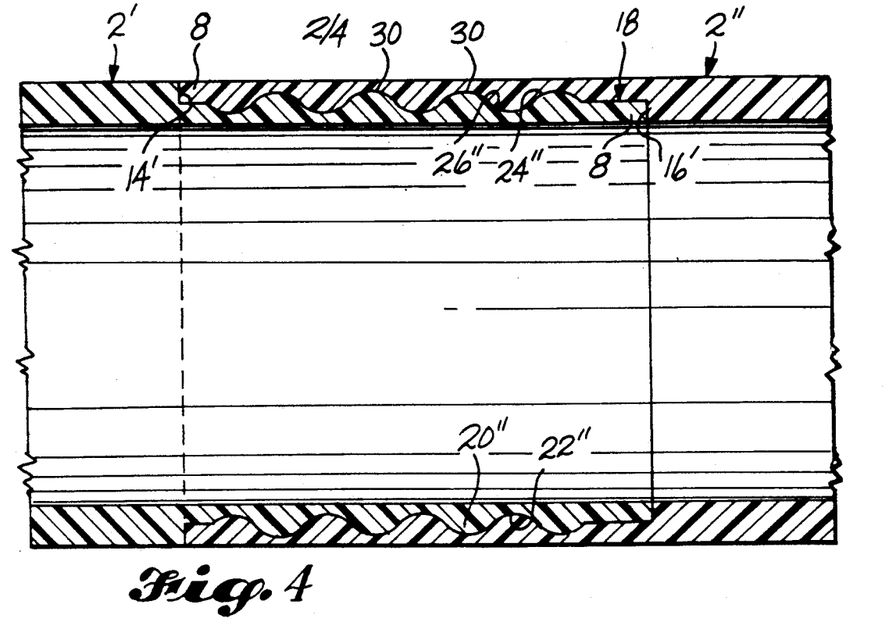
FIG. 4 is another such cross-sectional view illustrating one form of detachable joint between the sections.
Figure 5:
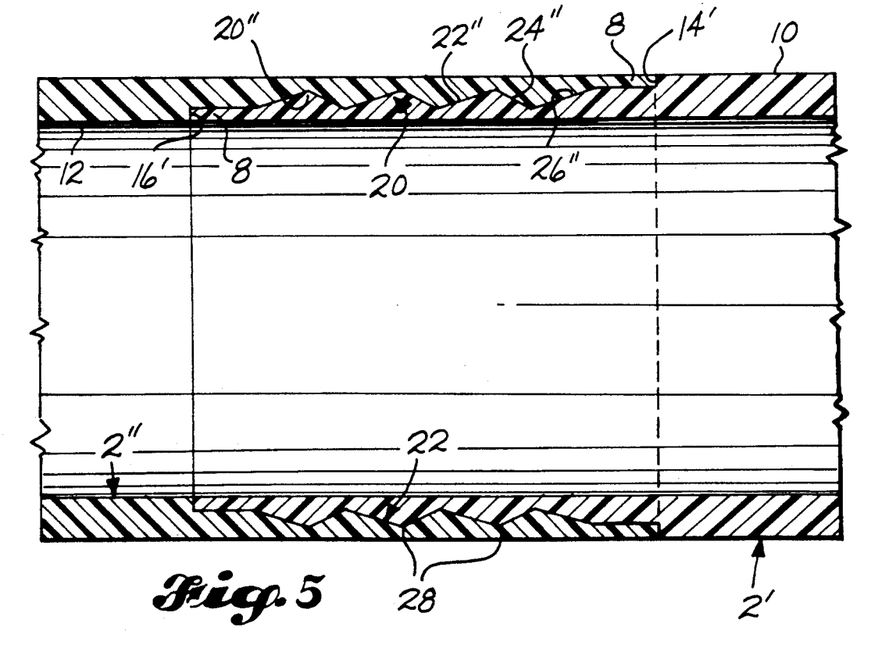
FIG. 5 is a third such cross-sectional view illustrating a second form of detachable joint between the sections.

Referring now to FIGS. 4 and 5, it will be seen that in this instance, the trailing flanks 24" of the respective ribs 20" of the respective male and female end portions 8' and 8" are sufficiently oblique to the axis 6 that the ribs 20" and grooves 22" of the respective pipe sections detachably interengage with one another when the ends 8 of the respective pipe sections 2 abut the transversely disposed surfaces 14' and 16' of the rabbets and the distended female end portion 8" of the pipe section 2" contracts for the last time. The leading and trailing flanks 26" and 24" of the respective ribs 20" may coterminate substantially at the respective outer and inner circles 21 and 23, respectively, as in FIG. 5. Or the leading and trailing flanks 26" and 24" of the respective ribs may be obliquely angled to one another and have crests 30 therebetween that form rounded fillets for the angles at points opposite the apices thereof, as in FIG. 4.

Several techniques can be employed for interengaging the pipe sections to form the joint. One is seen in FIGS. 1 and 2. Given, for example, a pipe string 2' of considerable length on the right-hand side of the Figures, the left-hand section 2" can be added to the same simply by inserting a flanged plug 32 in the left-hand end of the section 2" to serve as an anvil with which to drive the section into engagement with the string 2' at their adjacent ends 8. The hammer blows to the anvil are commonly applied by hand, but may be applied by a power-driven mechanism (not shown).

Figure 6:
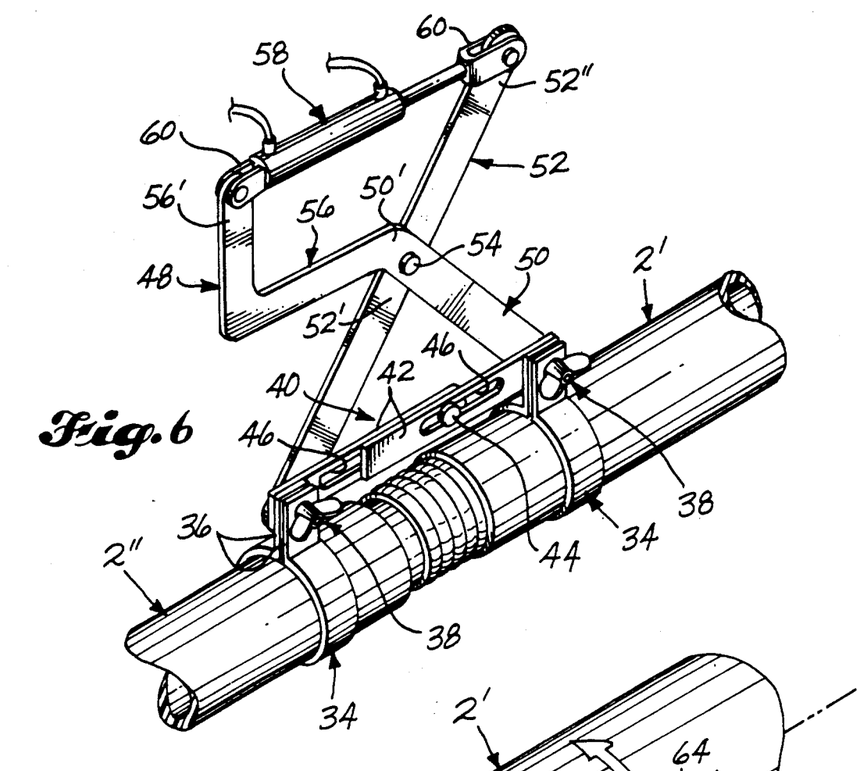
FIG. 6 is a perspective view of another means and mode by which the sections can be joined with one another.

FIG. 6 illustrates a further technique for interengaging the pipe sections, whether they are equipped to interlock with one another as in FIGS. 1-3, or to detachably interconnect with one another as in FIGS. 4 and 5. The two sections 2 are supported end-to-end of one another on a common axis in a pair of C-clamps 34 having opposing flanges 36 at their ends, with a wing-nutted bolt 38 bridging therebetween. Interconnecting the pair of C-clamps is a parallel drive mechanism 40 comprising a pair of slotted links 42 which are slidably interconnected by a rivet-like pin 44 in the slots 46 thereof. The drive mechanism 40 is powered by a hydraulic cylinder operated scissors device 48 having a pair of arms 50 and 52 which are pivotally interconnected with the clamps 34 and links 42 at the relatively remote ends of the links, and articulated with respect to one another at a pivot 54 in the respective center sections 50' and 52' thereof. One, 50, of the arms has a right angular crook 56 obliquely outriggered from the center section 50' thereof, and the respective relatively free end portions 56' and 52" of the arms are pivotally interconnected by a hydraulic cylinder 58 which has clevis connections 60 with the respective arms. When the pipe sections 2 are tightly secured in the C-clamps 34, the hydraulic cylinder 58 is actuated to articulate the arms with respect to one another and effect relative reciprocable motion between the pipe sections along a parallel to the pair of links 42.

Figure 7:
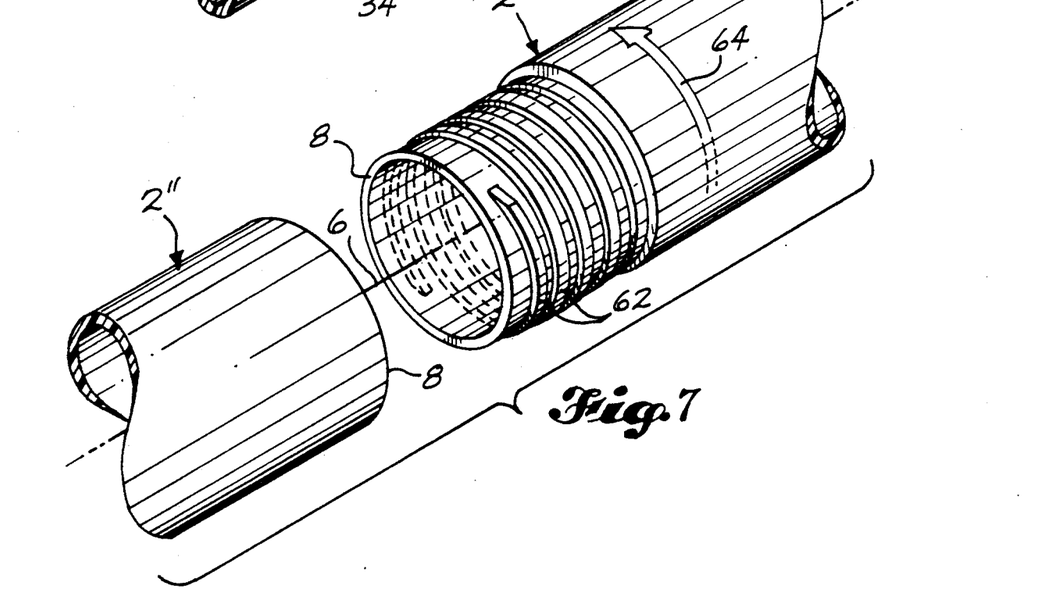
FIG. 7 is a perspective view of a further embodiment wherein the sections are joined by threading them together.
Figure 8:
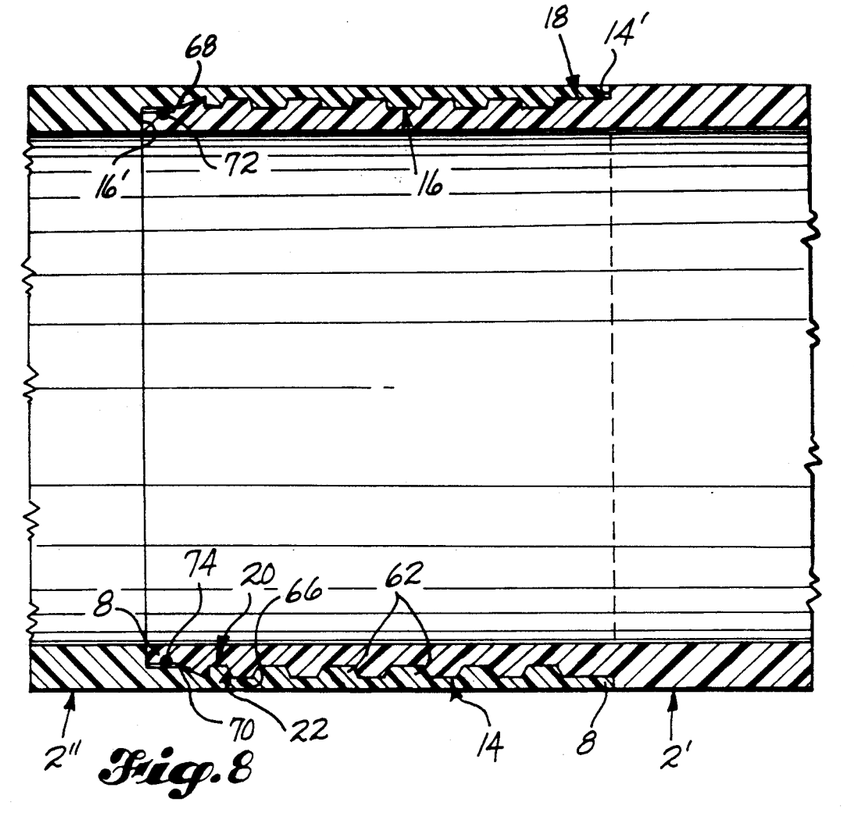
FIG. 8 is a cross-sectional view along the end-to-end axis of the sections in FIG. 7 when the joint has been made.
Figure 9:
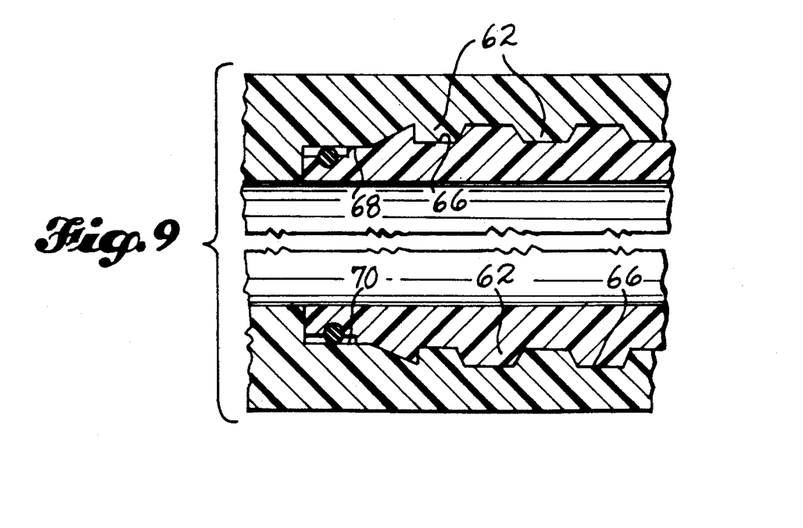
FIG. 9 is a relatively enlarged cross-sectional view of a part of the joint in FIGS. 7 and 8.

Still another technique is illustrated in FIGS. 7-9. In this embodiment, only single sets of ribs 20 and grooves 22 are employed and they are spaced apart from the end 8 of the female pipe section 2" and the transversely disposed surface 14' of the rabbet 14 in the male pipe section 2', respectively. Meanwhile, the axially extending surfaces 14" and 16" of the rabbets 14 and 16 have sets of helical multi-start threads 62 thereon in the spaces between the sets of ribs 20 and grooves 22 and the respective end 8 of the female pipe section 2" and the transversely disposed surface 14' of the rabbet in the male pipe section 2'. The sets of threads 62 are flatcrested and adapted to helically interengage with one another when the sections 2' and 2" are rotatably telescoped one within the other along the axis 6, as represented by the arrow 64. In addition, the respective sets of ribs 20 and grooves 22 are disposed adjacent the respective sets of threads 62 to lockingly interengage with one another when the sections are so rotatably telescoped one within the other to rotate the sets of threads beyond one another in the direction of the aforesaid transversely disposed surfaces 14' and 16' of the rabbets and abut the ends 8 of the sections with the surfaces, and vice versa, to form the joint. Commonly, the sets of ribs 20 and grooves 22 are formed for this purpose in the first and last helical grooves 66 of the respective sets of threads; and the ribs 20 are either formed at a smaller diameter than the threads 62, to enable the male section to penetrate the threads of the female, or in machining or otherwise fabricating the sections, the ribs 20 and threads 62 are formed in that sequence to assure that one can "thread through the other" when the sections are interengaged with one another. While the ribs 20 and grooves 22 are shown as adapted to interlock the sections in the manner of FIGS. 1-3, they may be adapted instead to detachably interconnect the sections in the manner of FIGS. 4 and 5. Similarly, while multi-start threads 62 are shown, the threads may be single-start, and they may be either right hand in direction, as shown, or left-hand in direction.

FIG. 8 also shows a means for increasing the fluid-tight nature of the joint at the inside thereof. The respective leading and trailing edge portions 68 and 70 of the axially extending surfaces 14" and 16" of the rabbets are plain conical surfaces, but the edge portion 68 of the male section 2' is rabbetted and the rabbet has a circumferential groove 72 formed therein to accommodate an elastomeric O-ring 74 which provides a secondary seal between the sections at the inside of the joint 18. Alternatively, the groove 72 and ring 74 may be replaced by a raised bead (not shown) of plastic on the male section 2', at the situs of the ring 74 in the rabbet of the edge portion 68. The bead is commonly machined within the male section during the fabrication of the pipe sections, but may be provided otherwise.

When it is desired to increase the fluid-tight nature of the joint at the outside thereof, a sleeve-like seal 76 of elastomeric material is commonly stretched about the main body of the male section 2', together with an annular clamping device 78 such as a screw-driven hose clamp (not shown) or the toggle-actuated hose clamp 80 seen in FIGS. 1-3. In addition, the transversely disposed surface 14' of the rabbet in the male pipe section 2', is given a chamfered corner 82 at the outer peripheral edge thereof, and the end 8 of the female pipe section 2" is given a correspondingly, but oppositely chamfered corner 84 at the outer peripheral edge thereof. The chamfer of corner 82 of the male section 2' enables the seal 76 to be stretched over it without damage, and together, the two corners 82 and 84 form a V-shaped circumferential groove 86 about the outer periphery of the joint 18, within which to accommodate the seal 76. When the joint has been made, the seal 76 is slipped about the joint 18 over the groove 86, the clamp 80 is circumposed about the seal, and the clamping mechanism 88 on the clamp is actuated to tightly engage the seal in the groove as shown.

I claim:

1. In combination,
a pair of plastic pipe sections arranged end-to-end of one another along a common axis and having relatively outer and inner peripheral surfaces thereon,
the adjacent ends of said pipe sections having annular rabbets formed therein at the relatively outer and inner peripheral surfaces thereof, respectively,
the rabbets having surfaces which are disposed relatively transverse the axis, and surfaces which extend relatively lengthwise of the axis,
the axially extending surfaces of said rabbets being tapered to the axis substantially at a common angle so that the end portion of one pipe sections telescopes within the end portion of the other pipe section, to form a male/female joint therebetween, when the pipe sections are reciprocated relatively toward one another along the axis to abut the end of the sections with the transversely disposed surfaces of the rabbets therein,
the axially extending surfaces of the rabbets having sets of axially successive ribs and grooves relatively raised thereon and recessed therein, respectively, which extend about the axis in planes transverse thereof and are disposed on the rabbets so that the ribs of the respective surfaces interengage with the grooves of the respective surfaces, and vice versa, to preserve the joint, when the ends of the sections abut the transversely disposed surfaces of the rabbets, and vice versa,
the sets of ribs and grooves being spaced apart from the end of the female pipe section and the tranversely disposed surface of the rabbet in the male pipe section, respectively,
the axially extending surfaces of the rabbets having sets of threads thereon in the spaces between the sets of ribs and grooves and the respective end of the female pipe section and the transversely disposed surface of the rabbet in the male pipe section,
the sets of threads being adapted to interengage with one another when the sections are rotatably telescoped one within the other along the axis, and
the respective sets of ribs and grooves being disposed adjacent the respective sets of threads to interengage with one another when the sections are so rotatably telescoped one within the other to rotate the sets of threads beyond one another in the direction of the transversely disposed surfaces of the rabbets and abut the ends of the sections with said surfaces, and vice versa, to form the joint.

2. The combination according to claim 1 wherein the sets of ribs and grooves are formed in the first and last helical grooves of the respective sets of threads, the respective leading and trailing edge portions of the axially extending surfaces of the rabbets are plain conical surfaces, and the edge portion of the male section has a circumferential bead formed thereon, which is adapted to provide a secondary seal between the sections at the inside of the joint.

3. A plastic pipe section comprising:
a tubular body having an axis extending between the ends thereof and relatively outer and inner peripheral surfaces thereon,
the ends of said body having annular rabbets formed therein at the relatively outer and inner peripheral surfaces thereof, respectively,
the rabbets having surfaces which are disposed relatively transverse the axis, and surfaces which extend relatively lengthwise of the axis,
the axially extending surfaces of the rabbets being tapered to the axis and substantially at a common angle to the axis so that when a pair of the pipe sections are reversedly disposed end-to-end of one another on a common axis, the end portion of one pipe section telescopes within the end portion of the other pipe section, to form a male/female joint therebetween, when the sections are reciprocated relatively toward one another along the axis to abut the ends of the pipe sections with the transversely disposed surfaces of the rabbets therein, the axially extending surfaces of the rabbets having sets of axially successive ribs and grooves relatively raised thereon and recessed therein, respectively, which extend about the axis of the body in planes transverse thereof and are disposed on the rabbets so that the ribs of the respective surfaces interengage with the grooves of the respective surfaces, and vice versa, to preserve the joint, when the ends of the sections abut the transversely disposed surfaces of the rabbets, and vice versa, the sets of ribs and grooves being spaced apart from the female end of the pipe section and the transversely disposed surface of the rabbet in the male end of the pipe section, respectively, the axially extending surfaces of the rabbets having sets of threads thereon in the spaces between the sets of ribs and grooves and the respective female end and transversely disposed surface of the rabbet in the male end of the pipe section, the sets of threads being adapted to interengage with one another when the aforesaid pair of pipe sections is rotatably telescoped one within the other along a common axis, and the respective sets of ribs and grooves being disposed adjacent the respective sets of threads to interengage with one another when the aforesaid pair of sections is so rotatably telescoped one within the other to rotate the sets of threads beyond one another in the direction of the transversely disposed surfaces of the rabbets and abut the ends of the sections with said surfaces, and vice versa, to form the joint.

4. The plastic pipe section according to claim 3 wherein the sets of ribs and grooves are formed in the first and last helical grooves of the respective sets of threads, the respective leading and trailing edge portions of the axially extending surfaces of the rabbets are plain conical surfaces, and the edge portion of the male end of the pipe section has a circumferential groove formed therein, to accommodate an O-ring for providing a secondary seal between the sections at the inside of the joint.

5. A method of joining two or more plastic pipe sections, each having an axis extending between the ends thereof and relatively outer and inner peripheral surfaces thereon, comprising;

forming annular rabbets in ends of the pipe sections at the relatively outer and inner peripheral surfaces thereof, respectively, the rabbets having surfaces which are disposed relatively transverse the axis, and surfaces which extend relatively lengthwise of the axis, tapering the axially extending surfaces of said rabbets to the axis substantially at a common angle so that the end portion of one pipe section telescopes within the end portion of the other pipe section, to form a male/female joint therebetween, when the pipe sections are disposed end-to-end of one another on a common axis and reciprocated relatively toward one another along the axis to abut the ends of the sections with the transversely disposed surfaces of the rabbets therein, forming sets of axially successive ribs and grooves on and in the axially extending surfaces of the rabbets, respectively, which extend about the axis of each pipe section in planes transverse thereof and are disposed on the rabbets so that the ribs of the respective surfaces interengage with the grooves of the respective surfaces, and vice versa, to preserve the joint, when the end sections abut the transversely disposed surfaces of the rabbets, and vice versa, arranging the pipe sections end-to-end of one another along a common axis, and reciprocating the sections relatively toward one another along the axis to abut the ends of the sections with the transversely disposed surfaces of the rabbets therein, and vice versa, the pipe sections being reciprocated relatively toward one another along the axis by forming sets of threads on the axially extending surfaces of the rabbets between the sets of ribs and grooves and the end of the female pipe section and the transversely disposed surface of the rabbet in the male pipe section, respectively, and rotatably telescoping the male pipe section into the female pipe section, first to interengage the sets of threads with one another, and then to rotate the sets of threads beyond one another in the direction of the transversely disposed surfaces of the rabbets and abut the ends of the sections with said surfaces, and vice versa, to interengage the respective sets of ribs and grooves with one another and form the joint.

6. In the combination of a pair of male/female pipe sections of semi-rigid but resiliently distensible plastic material, which are arranged end-to-end of one another along a common axis and have relatively outer and inner peripheral surfaces thereon, and annular rabbets formed on the adjacent end portions thereof at the relatively outer and inner peripheral surfaces thereof, respectively, so that the end portion of the male pipe section can be slideably inserted within the end portion of the female pipe section to form a male/female joint therebetween when the pipe sections are reciprocated relatively toward one another along the axis to be joined together, the improvement wherein:

the rabbets have surfaces which are disposed relatively transverse the axis, and surfaces which extend relatively lengthwise of the axis, the axially extending surfaces of the rabbets have cooperatively engageable retainer means thereon comprising successive sets of axially successive and axially contiguous ribs and grooves relatively raised thereon and recessed therein, respectively, the respective crests and bottoms of which ribs and grooves extend in full circles about the axis of the pipe sections, the crests of the respective ribs of the male pipe section and the bottoms of the respective grooves of the female pipe section extend at their centers in axially spaced relatively outer circles coinciding substantially with a common relatively outer cylindrical surface of revolution about the axis, and the bottoms of the respective grooves of the male pipe section and the crests of the respective ribs of the female pipe section extend at their centers in axially spaced relatively inner circles coinciding substantially with a common relatively inner cylindrical surface of revolution about the axis spaced relatively inwardly thereof from the relatively outer cylindrical surface of revolution thereabout, the axial spacing between the relatively outer circles is the same both between the crests of adjacent ribs on the male pipe section and between the bottoms of adjacent grooves on the female pipe section, and the axial spacing between the relatively inner circles is the same both between the bottoms of adjacent grooves on the male pipe section and between the crests of adjacent ribs on the female pipe section, and the shape and size of the ribs is the same on both the male and female pipe sections, and the grooves on the respective male and female pipe sections correspond in shape and size to the ribs thereof, so that when the end portion of the male pipe section is slideably inserted within the end portion of the female pipe section in forming the joint, each rib on the male pipe section progressively cooperatively engages, first with that groove on the female pipe section which is axially adjacent the end of the female pipe section, and then with each successive groove thereafter on the female pipe section, and in so doing, the body of each rib on the male pipe section substantially fills, first the aforesaid end adjacent groove on the female pipe section and then each successive groove thereafter, until the ends of the respective pipe sections abut the transversely disposed surfaces of the rabbets and the sets of ribs and grooves are interlocked in succession with one another to complete the joint, the respective ribs of the respective male and female pipe sections have leading flanks thereon which are disposed on those sides of the respective ribs oriented axially toward the respective ends of the respective pipe sections, and the leading flanks are conical and tapered toward the axis from the crests of the respective ribs for a distance sufficiently greater than the aforesaid spacing between the relatively inner and outer cylindrical surfaces of revolution about the axis, that the leading flanks form cam surfaces of sufficiently low acuity to the axis that when the end portion of the male pipe section is slideably inserted within the end portion of the female pipe section in forming the joint, the end portion of the female pipe section is progressively distended about the axis by the end portion of the male pipe section when the sets of ribs and grooves advance across one another from set to set, to enable the end portions of the pipe sections to be ratcheted together in successive stages in which the sets of ribs and grooves cooperatively engage one another as recited hereinabove, and alternately, advance across one another form set to set as the end portion of the female pipe section distends to accommodate the advance, and the respective ribs of the respective male and female pipe sections have trailing flanks thereon which are disposed on the opposing sides thereof oriented axially toward the respective transversely disposed surfaces of the respective rabbets on the respective end portions thereof, and the trailing flanks of the respective ribs are inclined to the axis from the crests of the respective ribs at substantially a common angle thereto adapted so that when the ends of the respective pipe sections abut the transversely disposed surfaces of the rabbets and the sets of ribs and grooves interlock in succession with one another to complete the joint, the end portions of the pipe sections are sufficiently interengaged to preserve the joint for use.

7. The combination according to claim 6 wherein the axially extending surfaces of the rabbets extend the entire axial distance between the ends of the pipe sections and the transversely disposed surfaces of the rabbets therein, and the sets of ribs and grooves are substantially coextensive with the axially extending surfaces of the rabbets.

8. The combination according to claim 7 wherein the axially extending surfaces of the rabbets have plain cylindrical portions thereof which lie between the sets of ribs and grooves on the respective surfaces and the end of the male pipe section and the transversely disposed surface of the rabbet in the female pipe section, respectively.

9. The combination according to claim 6 wherein the pipe sections are uniformly sized and shaped, and the ends of the sections and the transversely disposed surfaces of the rabbets therein, are adapted so that the relatively outer and inner peripheries of the joint are flush with the surfaces of the sections at the relatively outer and inner peripheries, respectively.

10. The combination according to claim 6 further comprising an annular seal of elastomeric material and an annular clamping device circumposed about the pair of pipe sections, with which to provide a secondary seal between the sections at the outside of the joint.

11. The combination according to claim 10 wherein the transversely disposed surface of the rabbet in the male pipe section has a chamfered corner at the outer peripheral edge thereof, and the end of the female pipe section has a correspondingly, but oppositely chamfered corner at the outer peripheral edge thereof, to cooperate in forming a circumferential groove about the outer periphery of the joint with which the seal can be accommodated when the clamping device is actuated to engage the seal about the joint.

12. The combination according to claim 6 wherein the trailing flanks of the respective ribs of the respective male and female pipe sections are sufficiently acute to the axis that the ribs and grooves of the respective pipe sections snap engage with one another, to interlock the sections, when the ends of the respective pipe sections abut the transversely disposed surfaces of the rabbets and the distended end portion of the female pipe section contracts for the last time.

13. The combination according to claim 6 wherein the trailing flanks of the respective ribs of the respective male and female pipe sections are inclined to the axis from the crests of the respective ribs at substantially right angles thereto.

14. The combination according to claim 6 wherein in the completed joint the leading and trailing flanks of the respective ribs of the respective male and female pipe sections coterminate substantially at the respective outer and inner circles, respectively.

15. The combination according to claim 6 wherein the trailing flanks of the respective ribs of the respective male and female pipe sections are sufficiently oblique to the axis that the ribs and grooves of the respective pipe sections detachably interengage with one another when the ends of the respective pipe sections abut the transversely disposed surfaces of the rabbets and the distended end portion of the female pipe section contracts for the last time.

16. The combination according to claim 15 wherein in the completed joint the leading and trailing flanks of the respective ribs of the respective male and female pipe sections coterminate substantially at the respective outer and inner circles, respectively.

17. The combination according to claim 6 wherein the leading and trailing flanks of the respective ribs of the respective male and female pipe sections are obliquely angled to one another and have crests therebetween that form rounded fillets for the angles at points opposite the apices thereof.

18. The combination according to claim 6 wherein the end of the male pipe section and the transversely disposed surface of the rabbet of the female pipe section are adapted so that the relatively inner periphery of the joint is flush with the surfaces of the sections at the relatively inner periphery thereof.

19. In a pipe section of semi-rigid but resiliently distensible plastic material, the body of which is tubular and has an axis extending between the ends thereof and relatively outer and inner peripheral surfaces thereon, and the end portions of which body have annular rabbets formed thereon at the relatively outer and inner peripheral surfaces thereof, to provide the pipe section with male and female end portions, respectively, whereby when a pair of the pipe sections are reversedly disposed end to end of one another on a common axis, the male end portion of one pipe section can be slideably inserted within the female end portion of the other pipe section to form a male/female joint therebetween when the pipe sections are reciprocated relatively toward one another along the common axis thereof to be joined together, the improvement wherein:

the rabbets have surfaces which are disposed relatively transverse the axis, and surfaces which extend relatively lengthwise of the axis, the axially extending surfaces of the rabbets have retainer means thereon which are cooperatively engageable from one of the pair of pipe sections to the other and comprise successive sets of axially successive and axially contiguous ribs and grooves relatively raised thereon and recess therein, respectively, the respective crests and bottoms of which ribs and grooves extend in full circles about the axis of the pipe section, the crest of the respective ribs of the male end portion and the bottoms of the respective grooves of the female end portion extend at their centers in axially spaces relatively outer circles coinciding substantially with a common relatively outer cylindrical surface of revolution about the axis, and the bottoms of the respective grooves of the male end portion and the crests of the respective ribs of the female end portion extend at their centers in axially spaced relatively inner circles coinciding substantially with a common relatively inner cylindrical surface of revolution about the axis spaced relatively inwardly thereof from the relatively outer cylindrical surface of revolution thereabout, the axial spacing between the relatively outer circles is the same both between the crests of adjacent ribs on the male end portion and between the bottoms of adjacent grooves on the female end portion, and the axial spacing between the relatively inner circles is the same both between the bottoms of adjacent grooves on the male end portion and between the crests of adjacent ribs on the female end portion, and the shape and size of the ribs is the same on both the male and female end portions, and the grooves on the respective male and female end portions correspond in shape and size to the ribs thereof, so that when the male end portion of the one pipe section is slideably inserted within the female end portion of the other pipe section in forming the joint, each ib on the male end portion of the one pipe section cooperatively engages, first with that groove on the female end portion of the other pipe section which is axially adjacent the end of the female end portion of the other pipe section, and then with each successive groove thereafter on said female end portion, and in so doing, the body of each rib on said male end portion substantially fills, first the aforesaid end adjacent groove on the female end portion and then each successive groove thereafter, until the end of the respective end portions abut the transversely disposed surfaces of the rabbets and the sets of ribs and grooves are interlocked in succession with one another to complete the joint, the respective ribs of the respective male and female end portions have leading flanks thereon which are disposed on those sides of the respective ribs oriented axially toward the respective ends of the respective end portions, and the leading flanks are conical and tapered toward the axis from the crests of the respective ribs for a distance sufficiently greater than the aforesaid spacing between the relatively inner and outer cylindrical surfaces of revolution about the axis, that the leading flanks form cam surfaces of sufficiently low acuity to the axis that when the male end portion of the one pipe section is slidably inserted within the female end portion of the other pipe section in forming the joint, the female end portion of the other pipe section is progressively distended about the axis by the male end portion of the one pipe section when the sets of ribs and grooves advance across one another from set to set, to enable the end portions of the pipe sections to be ratcheted together in successive stages in which the sets of ribs and grooves cooperatively engage with one another as recited hereinabove, and alternately, advance across one another from set to set as the female end portion of the other pipe section distends to accommodate the advance, and the respective ribs of the respective male and female end portions have trailing flanks thereon which are disposed on the opposing sides thereof oriented axially toward the respective transversely disposed surfaces of the respective rabbets on the respective end portions, and the trailing flanks of the respective ribs are inclined to the axis from the crests of the respective ribs at substantially a common angle thereto adapted so that when the ends of the respective end portions abut the transversely disposed surfaces of the rabbets and the sets of ribs and grooves interlock in succession with one another to complete the joint, the end portions of the pipe sections are sufficiently interengage to preserve the joint for use.

20. The plastic pipe sections according to claim 19 wherein the transversely disposed surface of the rabbet in the male portion of the pipe section has a chamfered corner at the outer peripheral edge thereof, and the female portion of the pipe section has a correspondingly, but oppositely chamfered corner at the outer peripheral edge thereof, whereby when the aforesaid pair of pipe sections is interengaged with one another along a common axis, the chamfered corners cooperate in forming a circumferential groove about the outer periphery of the joint within which a secondary seal can be accommodated.

21. The plastic pipe section according to claim 19 wherein the axially extending surfaces of the rabbets extend the entire axial distance between the ends of the pipe section and the transversely disposed surfaces of the rabbets therein, and the sets of ribs and grooves are substantially coextensive with the axially extending surfaces of the rabbets.

22. The plastic pipe section according to claim 21 wherein the axially extending surfaces of the rabbets have plain cylindrical portions thereof which lie between the sets of ribs and grooves on the respective surfaces and the end of the male end portion and the transversely disposed surface of the rabbet in the female end portion, respectively.

23. The plastic pipe section according to claim 19 wherein the trailing flanks of the respective ribs of the respective male and female end portions are sufficiently acute to the axis that the ribs and grooves of the respective pipe sections snap engage with one another, to interlock the sections, when the ends of the respective pipe sections abut the transversely disposed surfaces of the rabbets and the distended female end portion of the aforesaid other pipe section contracts for the last time.

24. The plastic pipe section according to claim 19 wherein the trailing flanks of the respective ribs of the respective male and female end portions are inclined to the axis form the crests of the respective ribs at substantially right angles thereto.

25. The plastic pipe section according to claim 19 wherein in the completed joint the leading and trailing flanks of the respective ribs of the respective male and female end portions coterminate substantially at the respective outer and inner circles, respectively.

26. The plastic pipe section according to claim 19 wherein the trailing flanks of the respective ribs of the respective male and female end portions are sufficiently oblique to the axis that the ribs and grooves of the respective pipe sections detachably interengage with one another when the ends of the respective pipe sections abut the transversely disposed surfaces of the rabbets and the distended female end portion of the aforesaid other pie section contracts for the last time.

27. The plastic pipe section according to claim 26 wherein in the completed joint the leading and trailing flanks of the respective ribs of the respective male and female end portions coterminate substantially at the respective outer and inner circles, respectively.

28. The plastic pipe section according to claim 19 wherein the leading and trailing flanks of the respective ribs of the respective male and female end portions are obliquely angled to one another and have crests therebetween that form rounded fillets for the angles at points opposite the apices thereof.

29. The plastic pipe section according to claim 19 wherein the end of the male end portion and the transversely disposed surface of the rabbet of the female end portion are adapted so that the relatively inner periphery of the joint is flush with the surfaces of the pair of pipe sections at the relatively inner periphery thereof.

30. A method of joining a pair of first and second pipe sections of semi-rigid but resiliently distensible plastic material, which have axis extending between the respective ends thereof and relatively outer and inner peripheral surfaces thereon, comprising:

forming annular rabbets on ends of the first and second pipe sections at the relatively outer and inner peripheral surfaces thereof, respectively, the rabbets having surfaces which are disposed relatively transverse the axis of the respective pipe sections and surfaces which extend relatively lengthwise of the axis of the respective pipe sections, and rabbets being adapted at the axially extending surfaces thereof so that the end portion of the first pipe section telescopes within the end portion of the second pipe section to form a male/female joint therebetween when the pipe sections are disposed end to end of one another on a common axis and reciprocated relatively toward one another along the axis to abut the ends of the sections with the transversely disposed surfaces of the rabbets therein, forming successive sets of axially successive and axially contiguous ribs and grooves on the axially extending surfaces of the rabbets, the ribs being relatively raised on the surfaces and the grooves relatively recessed therein, and the respective crests and bottoms of the ribs and grooves extending in full circles about the respective axis of the pipe sections, and arranging the pipe sections end to end of one another along a common axis, and reciprocating the sections relatively toward one another along the axis in successive stages in which the end portion of the first pipe section is progressively slideably inserted within the end portion of the second pipe section, and the sets of ribs and grooves on the respective sections are cooperatively engaged with one another and alternately advanced across one another form set to set as the end portion of the second pipe section distends to accommodate to the relative advance of the first pipe section at each stage, the crests of the respective ribs of the first pipe section and the bottoms of the respective grooves of the second pipe section extending at their centers in axially spaced relatively outer circles coinciding substantially with a common relatively outer cylindrical surface of revolution about the aforesaid common axis of the pipe sections, and the bottoms of the respective grooves of the first pipe section and the crests of the respective ribs of the second pipe section extending at their centers in axially spaced relatively inner circles coinciding substantially with a common relatively inner cylindrical surface of revolution about the aforesaid common axis spaced relatively inwardly thereof from the relatively outer cylindrical surface of revolution thereabout, the axial spacing between the relatively outer circles being the same both between the crests of adjacent ribs on the first pipe section and between the bottoms of adjacent grooves on the second pipe section, and the axial spacing between the relatively inner circles being the same both between the bottoms of adjacent grooves on the first pipe section and between the crests of adjacent ribs on the second pipe section, and the shape and size of the ribs being the same on both the first and second pipe sections, and the grooves on the respective pipe sections corresponding in shape and size to the ribs thereof, so that when the end portion of the first pipe section is slideably inserted within the end portion of the second pipe section in forming the joint, each rib on the first pipe section progressively cooperatively engages, first with that groove on the second pipe section which is axially adjacent the end of the second pipe section, and then with each successive groove thereafter on the second pipe section, and in so doing, the body of each rib on the first pipe section substantially fills, first the aforesaid end adjacent groove on the second pipe section and then each successive groove thereafter, until the ends of the respective pipe sections abut the transversely disposed surfaces of the rabbets and the sets of ribs and grooves are interlocked in succession with one another to complete the joint, the respective ribs of the respective pipe sections having leading flanks thereon which are disposed on those sides of the respective ribs oriented axially towards the respective ends of the respective pipe sections, and the leading flanks being conical and tapered toward the common axis from the crests of the respective ribs for a distance sufficiently greater than the aforesaid spacing between the relatively inner and outer cylindrical surfaces of revolution about the axis, that the leading flanks form cam surfaces of sufficiently low acuity to the axis that when the end portion of the first pipe section is slideably inserted within the end portion of the second pipe section in forming the joint, the end portion of the second pipe section is progressively distended about the axis by the end portion of the first pipe section when the sets of ribs and grooves advance across one another form set to set, to enable the end portions of the pipe sections to be ratcheted together in successive stages in which the sets of ribs and grooves cooperatively engage one another as recited hereinabove, and alternately advance across one another from set to set as the end portion of the second pipe section distends to accommodate the advance.

* * * * *

UNITED STATES PATENT AND TRADEMARK OFFICE
CERTIFICATE OF CORRECTION

PATENT NO. : 5,015,014

DATED : May 14, 1991

INVENTOR(S) : Gerald T. Sweeney

It is certified that error appears in the above-indentified patent and that said Letters Patent is hereby corrected as shown below:

In Column 8, line 6 thereof, change "section" to --section--;

In Column 8, line 10 thereof, change "end" to --ends--;

In Column 11, Line 51 thereof, change "form" to --from--;

In Column 13, line 39 thereof, change "recess" to --recessed--;

In Column 13, line 43 thereof, change "crest" to --crests--;

In Column 13, line 46 thereof, change "spaces" to --spaced--;

In Column 14, line 4 thereof, change "ib" to --rib--;

In Column 14, line 14 thereof, change "end" to --ends--;

In Column 14, line 58 thereof, change "interengage" to --interengaged--;

In Column 14, line 64 thereof, insert "end" between "female" and "portion";

In Column 15, line 31 thereof, change "form" to --from--;

In Column 15, line 66 thereof, change "axis" to --axes--;

In Column 16, lines 5, 7 and 24 thereof, change "axis" to --axes--;

In Column 16, line 35 thereof, change "form" to --from--;

UNITED STATES PATENT AND TRADEMARK OFFICE
CERTIFICATE OF CORRECTION

PATENT NO. : 5,015,014

DATED : May 14, 1991

INVENTOR(S) : Gerald T. Sweeney

Page 2 of 2

It is certified that error appears in the above-indentified patent and that said Letters Patent is hereby corrected as shown below:

In Column 18, line 11 thereof, change "form" to --from--;

Signed and Sealed this

Twenty-first Day of June, 1994

Attest:

BRUCE LEHMAN

*Attesting Officer*     *Commissioner of Patents and Trademarks*